(12) United States Patent
DuBose

(10) Patent No.: US 8,566,862 B2
(45) Date of Patent: *Oct. 22, 2013

(54) SYSTEM AND METHOD FOR ENHANCED ADVERTISING IN A VIDEO CONTENT NETWORK

(71) Applicant: Time Warner Cable Inc., New York, NY (US)

(72) Inventor: Kreig DuBose, Wheat Ridge, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,029

(22) Filed: Nov. 1, 2012

(65) Prior Publication Data

US 2013/0160047 A1    Jun. 20, 2013

Related U.S. Application Data

(63) Continuation of application No. 12/267,685, filed on Nov. 10, 2008, now Pat. No. 8,321,887.

(51) Int. Cl.
*H04N 7/10* (2006.01)
*H04N 7/025* (2006.01)

(52) U.S. Cl.
USPC .............................. 725/32; 725/144; 725/102

(58) Field of Classification Search
None
See application file for complete search history.

(56) References Cited

U.S. PATENT DOCUMENTS

| | | | |
|---|---|---|---|
| 5,805,974 A | 9/1998 | Hite et al. | |
| 6,002,393 A | 12/1999 | Hite et al. | |
| 6,266,816 B1 | 7/2001 | Watson, Jr. | |
| 6,993,782 B1 | 1/2006 | Newberry | |
| 7,073,189 B2 | 7/2006 | McElhatten et al. | |
| 7,174,126 B2 | 2/2007 | McElhatten et al. | |
| 7,716,700 B2 * | 5/2010 | Carlucci et al. | 725/32 |
| 8,321,887 B2 * | 11/2012 | Dubose | 725/32 |

(Continued)

OTHER PUBLICATIONS

Society of Cable Communications Engineers, Engineering Committee, Digital Video Subcommittee, American National Standard, ANSI/SCTE 35 2004, Digital Program Insertion Cueing Message for Cable, pp. 1-37.

(Continued)

*Primary Examiner* — Mark D Featherstone
*Assistant Examiner* — Michael M Nguyen
(74) *Attorney, Agent, or Firm* — Otterstedt, Ellenbogen & Kammer, LLP

(57) ABSTRACT

A video content network having a plurality of program channels is operated, and a target time slot for an enhanced advertisement is identified. At least some of the plurality of program channels have programs scheduled during the target time slot. The target time slot is signaled to a plurality of terminals connected to the video content network. Each of the terminals is viewing a given one of the program channels prior to the signaling. Responsive to the signaling, the programs scheduled during the target time slot are effectively paused at a program time corresponding to a beginning of the time slot, and the enhanced advertisement is caused to be displayed on the terminals. Responsive to an end of the enhanced advertisement, the programs scheduled during the target time slot are resumed at the program time corresponding to the beginning of the time slot. Thus, substantially all viewers of the video content network during the target time slot are exposed to the enhanced advertisement regardless of which of the plurality of program channels the viewers were watching during the target time slot.

4 Claims, 10 Drawing Sheets

(56) References Cited

U.S. PATENT DOCUMENTS

| | | | |
|---|---|---|---|
| 8,327,399 B2* | 12/2012 | Noll et al. ............. | 725/34 |
| 2002/0056121 A1* | 5/2002 | Ledbetter ............. | 725/87 |
| 2002/0087972 A1 | 7/2002 | Cragun et al. | |
| 2003/0056217 A1 | 3/2003 | Brooks | |
| 2003/0084441 A1 | 5/2003 | Hunt | |
| 2003/0208763 A1 | 11/2003 | McElhatten et al. | |
| 2003/0208767 A1 | 11/2003 | Williamson et al. | |
| 2004/0015999 A1 | 1/2004 | Carlucci et al. | |
| 2004/0045022 A1 | 3/2004 | Riedl | |
| 2004/0078829 A1 | 4/2004 | Patel et al. | |
| 2004/0103429 A1 | 5/2004 | Carlucci et al. | |
| 2004/0163101 A1 | 8/2004 | Swix et al. | |
| 2004/0210944 A1* | 10/2004 | Brassil et al. ............. | 725/135 |
| 2004/0244058 A1 | 12/2004 | Carlucci et al. | |
| 2005/0015816 A1 | 1/2005 | Christofalo et al. | |
| 2005/0018691 A1 | 1/2005 | Riedl et al. | |
| 2005/0034171 A1* | 2/2005 | Benya ............. | 725/143 |
| 2005/0039205 A1 | 2/2005 | Riedl | |
| 2005/0060229 A1 | 3/2005 | Riedl et al. | |
| 2005/0060742 A1 | 3/2005 | Riedl et al. | |
| 2005/0060745 A1 | 3/2005 | Riedl et al. | |
| 2005/0078840 A1 | 4/2005 | Riedl | |
| 2005/0183111 A1 | 8/2005 | Cragun et al. | |
| 2005/0235330 A1 | 10/2005 | O'Donnell et al. | |
| 2005/0278761 A1 | 12/2005 | Gonder et al. | |
| 2005/0289588 A1 | 12/2005 | Kinnear | |
| 2006/0090186 A1 | 4/2006 | Santangelo et al. | |
| 2006/0130107 A1 | 6/2006 | Gonder et al. | |
| 2006/0218604 A1 | 9/2006 | Riedl et al. | |
| 2006/0280437 A1 | 12/2006 | Logan et al. | |
| 2007/0094689 A1 | 4/2007 | McElhatten et al. | |
| 2007/0130595 A1 | 6/2007 | McElhatten et al. | |
| 2007/0204292 A1 | 8/2007 | Riedl et al. | |
| 2007/0245388 A1 | 10/2007 | Shen | |
| 2007/0245391 A1 | 10/2007 | Pont | |
| 2007/0250887 A1* | 10/2007 | Ting ............. | 725/110 |
| 2008/0060002 A1 | 3/2008 | Noll | |
| 2008/0060035 A1 | 3/2008 | Tsang | |
| 2008/0172690 A1 | 7/2008 | Kanojia | |
| 2009/0249390 A1* | 10/2009 | Corvin ............. | 725/32 |

OTHER PUBLICATIONS

Digital Program Insertion Taps New Advertising Revenue, C-COR, State College, PA, 2005, pp. 1-2.

Balabanian et al., An introduction to Digital Storage Media—Command and Control (DSM-CC), 1996 Institute of Electrical and Electronics Engineers, pp. 1-14.

Wayne Sheldrick et al., Business Models: Digital program insertion, Broadcast Engineering, Jul. 1, 2002, pp. 1-4.

Mega Hertz—Provider of "Multi-Vendor System Solutions" TM, (MVSS), 2008, pp. 1-3, Mega Hertz Company, Greenwood, CO, USA.

StreamBridge™ CR30 DPI, Digital Cue Tone Translation and Insertion System, triveni Digital, Princeton, New Jersey, USA, pp. 1-4.

Society of Cable Telecommunications Engineers, Engineering Committee, Digital Video Subcommitee, American National Standard, ANSI/SCTE 35 2007, Digital Program Insertion Cueing Message for Cable, pp. 1-42.

Michael Acer, Digital Program Insertion, Communications Technology, Sep. 1, 2007, pp. 1-4.

SCTE Announces New DPI Standardization Projects, News—Society of Cable Telecommunications Engineers, Aug. 9, 2004, pp. 1-2.

Tim Arango, Cable Firms Join Forces to Attract Focused Ads, New York Times, http://www.nytimes.com/2008/03/10/business/media/10cable.html, Mar. 10, 2008, pp. 1-8.

Society of Cable Communications Engineers, Engineering Committee, Digital Video Subcommittee, American National Standard, ANSI/SCTE 104 2004, Automation System to Compression System Communications Applications Program Interface (API), pp. 1-137.

Digital Program Insertion—Project Primer, Apr. 21, 2005, pp. 1-3, Cablelabs, Louisville, Colorado, USA, www.cablelabs.com/projects/dpi/primer.

OpenCable Specifications Enhanced TV Application Messaging Protocol 1.0; OC-SP-ETV-AM1 0-102-050727-plus-ECNs; copyright 2004-2005 Cable Television Laboratories Inc.

OpenCable Guidelines "Enhanced TV Operational Guidelines; OC-GL-ETV-OG-V01-060714"; copyright 2006 Cable Television Laboratories, Inc.

OpenCable Guidelines "Enhanced TV User Interface Guidelines; OC-GL-ETV-UIG-V02-060418"; copyright 2005-2006 Cable Television Laboratories, Inc.

OpenCable Specifications "Enhanced TV Binary Interchanae Format 1 0; OC-SP-ETV-BIF1 0-104-070921"; copyright 2005-2007 Cable Television Laboratories, Inc.

Wikipedia, "Enhanced TV Binary Interchange Format", http://en.wikipedia.org/wiki/Enhanced_TV_Binary_Interchange_Format.

Wikipedia, "Enhanced Television", http://en_wikipedia.org/wiki/Enhanced_Television.

OpenCable ETV, CableLabs, "Enhanced Television (ETV) Overview", http://www.opencable.com/etv/etv_overview.html.

Oracle Video Streaming, http://system.vccs.edu/its/projects/oracle/project/OVSModel.htm.

Gotuit Powervideo Suite Product Profile, CrunchBase, http://www.crunchbase.com/product/gotuit-powervideo-suite (1 of 2), May 12, 2008.

Navic Networks: Technology, Admira Optimized Media, http://www.navic.tv/technologyy/index.php.

GoldPocket Interactive Creates Broadband ITV Experience for TBS's New Comedy Series "Daisy Does America", http://www.tandbergtv.com/newsview_ink?newsid=263; May 12, 2008.

Welcome to OpenTV; hitp://www.opentv.com/solutions/ondemand.htm; May 12, 2008.

Welcome to OpenTV; OpenTV Participate Demo, http://www.opentv.com/products/participate.htm; May 12, 2008.

CableLabs Video-on-Demand Content 1.0 Specification; MD-SP-VOD-CONTENT1.0-001-041210.

* cited by examiner

300

SYSTEM AND METHOD FOR ENHANCED ADVERTISING IN A VIDEO CONTENT NETWORK

CROSS-REFERENCE TO RELATED APPLICATION

This application is a continuation, under 37 CFR 1.53(b), of co-assigned U.S. patent application Ser. No. 12/267,685 of inventor Kreig DuBose, and claims the benefit thereof, said application Ser. No. 12/267,685 having been filed on 10 Nov. 2008, and entitled at its filing "SYSTEM AND METHOD FOR ENHANCED ADVERTISING IN A VIDEO CONTENT NETWORK." The complete disclosure of the aforesaid application Ser. No. 12/267,685 is expressly incorporated herein by reference in its entirety for all purposes.

FIELD OF THE INVENTION

The present invention relates generally to communications systems and methods, and, more particularly, to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies the methodologies for video and audio data compression which allow multiple programs, with different video and audio feeds, multiplexed in a transport stream traversing a single transmission channel. A digital TV receiver may be used to decode an MPEG-2 encoded transport stream, and extract the desired program therefrom.

In accordance with the MPEG-2 standard, video data may be compressed based on a sequence of groups of pictures (GOPs), made up of three types of picture frames—intra-coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multi-plex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" functions) furnished by the DVR.

A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast. Note that an NDVR can be distinguished from a DVR in that the latter, storage of programs and the like is local to the DVR, while in the former (NDVR) case, such storage is at the server or head end level. Examples of such techniques are set forth in US Patent Publications 2003/0208767 of Williamson et al., 2005/0034171 of Benya, and 2006/0090186 of Santangelo et al., the complete disclosures of all three of which are expressly incorporated herein by reference in their entirety for all purposes.

US Patent Application Publication 2004/0015999 of Carlucci et al. entitled "Program Storage, Retrieval, and Management Based on Segmentation Messages, discloses segmentation messages indicative of locations of upcoming events, such as the start and end of programs and program portions, and/or rights related to the programs and program portions, which are used by cable systems and the like to store programs and program portions for later retrieval and transmission to customers on request. Storage, retrieval and management of programming are thereby facilitated. The complete disclosure of US Patent Application Publication 2004/0015999 of Carlucci et al. is expressly incorporated herein by reference in its entirety for all purposes.

US Patent Application Publication 2004/0244058 of Carlucci et al. entitled "Programming content processing and management system and method," discloses a technique to effectively receive streaming multimedia content in digital form, parse and segment the received transport stream and process the segmented content. Such treatment of received programming content provides for efficient storage of such programming content, and effectively provides for access to such content by administrators of a broadband system as well as users of such systems. The complete disclosure of US Patent Application Publication 2004/0244058 of Carlucci et al. is expressly incorporated herein by reference in its entirety for all purposes.

SUMMARY OF THE INVENTION

Principles of the present invention provide techniques for enhanced advertising in a video content network. In one aspect, an exemplary method includes the steps of operating a video content network having a plurality of program channels, and identifying a target time slot for an enhanced advertisement. At least some of the plurality of program channels have programs scheduled during the target time slot. Also included is signaling the target time slot to a plurality of terminals connected to the video content network. Each of the terminals is viewing a given one of the program channels prior to the signaling. Responsive to the signaling, the programs scheduled during the target time slot are effectively paused at a program time corresponding to a beginning of the time slot, and the enhanced advertisement is caused to be displayed on the terminals. Responsive to an end of the enhanced advertisement, the programs scheduled during the target time slot are resumed at the program time corresponding to the beginning of the time slot. Thus, substantially all viewers of the video content network during the target time slot are exposed to the enhanced advertisement regardless of which of the plurality of program channels the viewers were watching during the target time slot.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

An exemplary embodiment of an apparatus or system, according to still another aspect of the invention, can include a memory and at least one processor coupled to the memory. The processor can be operative to facilitate performance of one or more of the method steps described herein. Non-limiting examples of processors are those in an origination system, a head end of a video content network (such as, by way of example and not limitation, in an acquisition and staging processor and/or video server thereof), a digital set-top terminal, and the like. In a further aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments have the advantage of affording digital program insertion across multiple operators.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Aspects of the invention are directed to delivering programming content and advertising to users through a broadband communications network, e.g., a cable TV network. Some or all programs or program channels may be afforded a network personal video recorder (NPVR) service to enhance a user's enjoyment of programming content. In accordance with the NPVR service, broadcast programs (or at least those broadcast programs afforded the NPVR service) are recorded at a head end of a cable network when they are delivered to a user at a set-top terminal. Thus, the user not only may "reserve" for review a future program and a previously broadcast program, but also restart an in-progress program since it has been recorded at the head end regardless of any user request. That is, the NPVR service obviates the need of a proactive effort otherwise required of a typical DVR user, which includes deciding and actively electing in advance what shows to record. In addition, the NPVR service furnishes trick mode functions (e.g., rewind, pause and fast-forward functions) for manipulating a presentation of recorded programming content.

Optionally, some instances of the invention can be implemented within the context of an improved NPVR service, wherein some or all programs afforded an NPVR service or on an NPVR enabled channel, especially those shown during the TV prime time, may not be afforded all of the NPVR service features. For example, a user may not be able to fast-forward one such program during its broadcast. In addition, a user may not be able to use the aforementioned NPVR reservation capability to freely time-shift a broadcast program for later viewing, without regard for its broadcast schedule. Rather, in some cases, a "Prime Time On Demand (PTOD)" service (hereinafter referred to as a PTOD program) is partly subject to its broadcast schedule. In some cases, the end time of a PTOD program may be restrictively extended beyond its broadcast schedule. Again, the features described in this paragraph are entirely optional.

Figure 1:
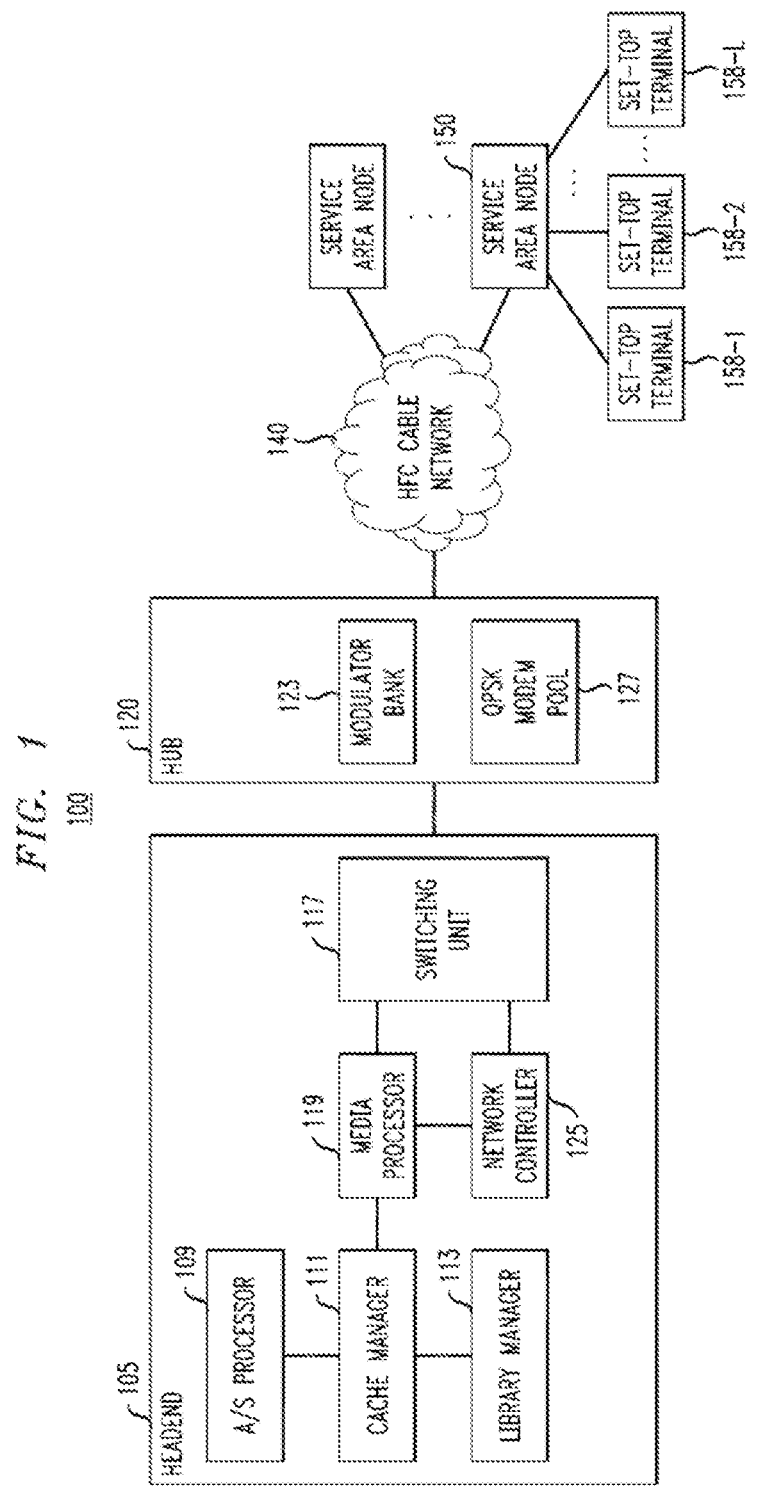
FIG. 1 is a block diagram of a broadband communications system in accordance with an aspect of the invention.

An exemplary implementation of an NPVR service, useful with one or more aspects of the invention, will now be described. FIG. 1 illustrates broadband communications system 100 for providing the NPVR service. For example, system 100 in this instance includes a cable system for delivering information and entertainment programs to set-top terminals on the user premises. As shown in FIG. 1, system 100 includes head end 105, hub 120, hybrid fiber coax (HFC) cable network 140 and different service area nodes including node 150, which in this instance is connected to set-top terminals 158-1 through 158-L in a neighborhood, where L represents an integer.

Head end 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, pulse-code modulation (PCM), AC3, or other digital audio, three dimensional graphic objects, application programs, application data files, etc. Although specific examples of programs and services which may be provided by the aforementioned sources are given herein, other programs and services may also be provided by these or other sources.

Acquisition/Staging (A/S) processor 109 in head end 105 processes program materials including, e.g., TV program streams, from one or more of the aforementioned sources in analog and digital forms. Analog TV program streams may be formatted according to the National Television Standards Committee (NTSC) or Phase Alternating Line (PAL) broadcast standard. Digital TV streams may be formatted according to the Digital Video Broadcasting (DVB), Society of Cable Telecommunications Engineers (SCTE), or Advanced Television Systems Committee (ATSC) standards. Processor 109 extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 23 to view program material provided by HBO; program channel 32 to view program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from head end 105 to a set-top terminal.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container for any object or set of objects that may be desired to implement a service, including video, audio, images, application executables, scripts, configuration files, text, fonts, and HTML pages (or pointers referencing their storage locations). In addition to the raw content, metadata is also a part of an asset object that describes characteristics of the asset. For example, asset metadata may describe attributes that are inherent in the content of the asset, such as the rating, format, duration, size, or encoding method. Values for asset metadata are determined at the time the asset is created.

Figure 2:
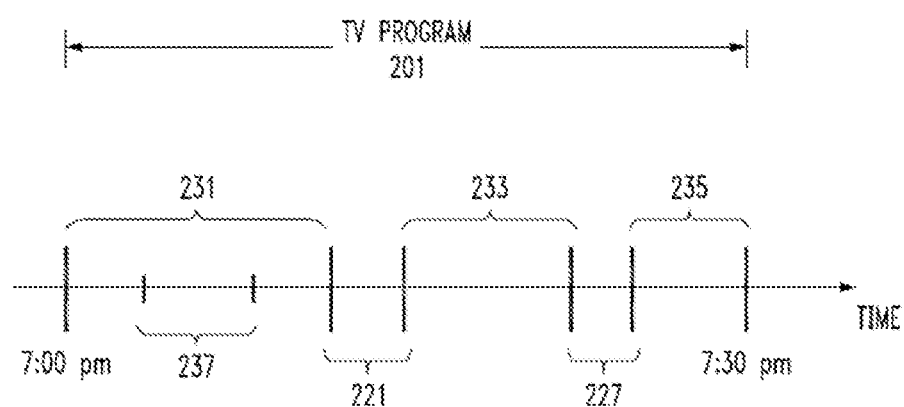
FIG. 2 illustrates a TV program comprising multiple program segments which is provided in the system of FIG. 1.

An asset concerning a program may include trick files associated with the program as well. FIG. 2 illustrates TV program 201 which spans from 7:00 p.m. to 7:30 p.m. Program 201 includes a show interrupted by commercials, which is typical. Thus, the program content in this instance consists of show segments 231, 233 and 235, interleaved with commercial segments 221 and 227. The TV program streams received by processor 109 are pre-processed, e.g., by the providers, to include indicators, e.g., cue-tones, on which processor 109 relies to identify the demarcations (or edges) of different programs and program segments within each program. Thus, in this instance before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. Another set of cue-tones may be inserted to delimit a "chapter" (denoted 237) within a program. A chapter is a self-contained subprogram, e.g., a skit, monolog, song performance, news report, weather report, etc. within a program. With the cue-tones defining one such chapter, processor 109 is capable of identifying the chapter and creating an asset concerning the same.

For illustrative purposes, assume that TV program 201 in this instance is an initial broadcast program. Processor 109 collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109 while processing TV program 201 may locate the corresponding program guide data to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with program 201 as part of the asset which are used to perform trick mode functions (e.g., pausing, rewinding and fast-forwarding) on program 201. One such trick file in this instance is a "fast-forward" trick file which contains an array of identifiers of I-frames in the program stream (MPEG-2 encoded as mentioned before) corresponding to program 201 in a forward direction. Another trick file is a "rewind" trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Otherwise, a "cache miss" requires locating the requested program in the library storage, thereby incurring a delay in the retrieval of the program.

Network controller 125 assigns resources for transporting program materials to set-top terminals and communicates various data including system information with the terminals. Upstream data from a set-top terminal to network controller 125 is communicated via a reverse passband, e.g., 5-40 MHz band, of a coaxial cable. The reverse passband includes reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 25 may change after a system reconfiguration. Nevertheless, each set-top terminal and controller 25 is also assigned a media access control (MAC) address on a permanent basis, surviving any system reconfiguration.

Downstream data from network controller 125 to a set-top terminal is communicated via forward data channels (FDCs). These channels, often referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or changes from another channel to channel 2, terminal 158-1 in a well known manner scans for any transport streams transporting programs to the neighborhood. In system 100, each transport stream is identified by a unique transport stream identification (TSID).

Figure 3:
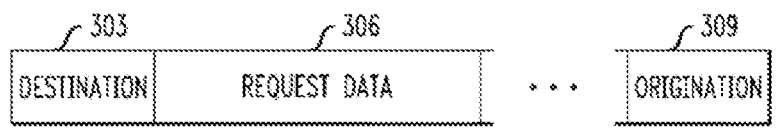
FIG. 3 illustrates a request for program material from a set-top terminal in the system of FIG. 1.

Continuing the above example, once the TSIDs of the transport streams are detected, terminal 158-1 sends through QPSK modem pool 127 a request for program channel 2 material. FIG. 3 illustrates one such request (denoted 300) sent from a set-top terminal to network controller 125 via an RDC. As shown in FIG. 3, request 300 includes destination field 303 which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

Figure 4:
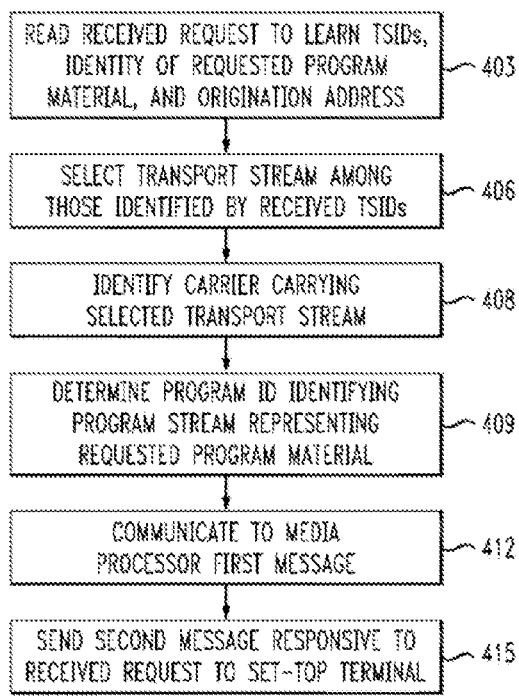
FIG. 4 is a flow chart depicting a process for providing program material in response to the request of FIG. 3.

After receiving request 300, network controller 125 reads the received request to learn the TSIDs, the identity of the requested program material, and the origination address therein, as indicated at step 403 in FIG. 4. Network controller 125 communicates with media processor 119 to determine the capacity required for transmitting the requested program material. Based on the required capacity, controller 125 at step 406 selects a transport stream among those identified by the received TSIDs which is suitable for transporting the requested program material. Controller 125 at step 408 identifies the carrier carrying the selected transport stream.

Figure 5:
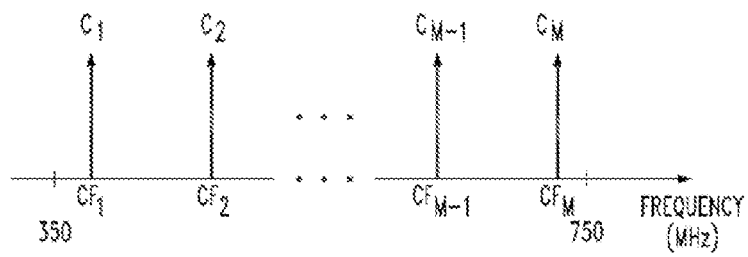
FIG. 5 illustrates selected carriers for transmitting program materials in a forward passband of the system of FIG. 1.

Referring also to FIG. 1, modulator bank 123 in this instance is located in hub 120 connected to head end 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 5 illustrates M carriers, $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate 9 or more program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up from the table the carrier associated with the TSID of the selected transport stream. Based on the requested program channel, network controller 125 at step 409 determines the program ID identifying the program stream representing the requested program material, i.e., program channel 2 material in this instance, which is then multiplexed with other program streams in the selected transport stream. At step 412, network controller 125 communicates to media processor 119 a first message containing the identity of the modulator in modulator bank 123 which corresponds to the carrier, say, $C_1$, just determined, and the program ID associated with the requested program channel material just determined. Network controller 125 at step 415 sends, through QPSK modem pool 127, a second message responsive to the received request to set-top terminal 158-1 identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

Figure 6:
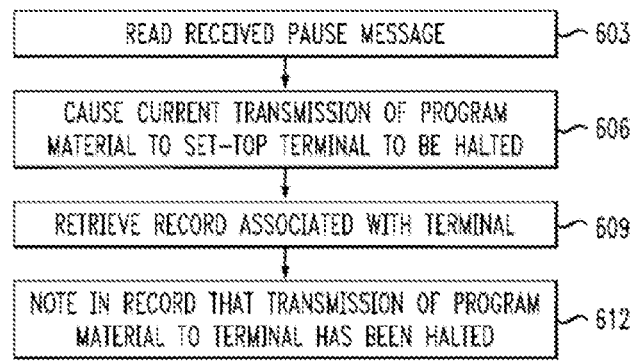
FIG. 6 is a flow chart depicting a process for pausing a program in response to a pause message from a set-top terminal.

When the user issues a pause command to terminal 158-1, e.g., by pressing a "pause" key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. After receiving the pause message, processor 119 reads the received pause message, as indicated at step 603 in FIG. 6. Processor 119 at step 606 causes the current transmission of the program material to set-top terminal 158-1 (identified by the received IP and/or MAC address) to be halted at the I-frame immediately following the last I-frame identified in the received message. Processor 119 at step 609 retrieves the record associated with terminal 158-1. Processor 119 at step 612 notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 7:
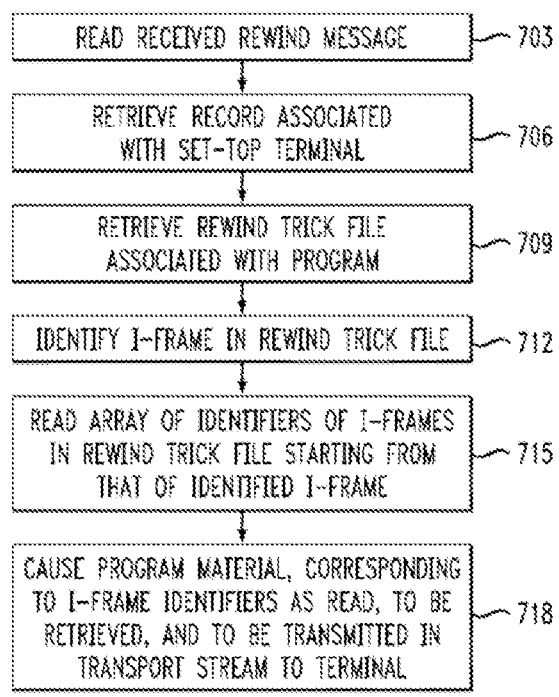
FIG. 7 is a flow chart depicting a process for rewinding a program in response to a rewind message from a set-top terminal.

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1. After receiving such a rewind message, processor 119 reads the received rewind message, as indicated at step 703 in FIG. 7. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Figure 8:
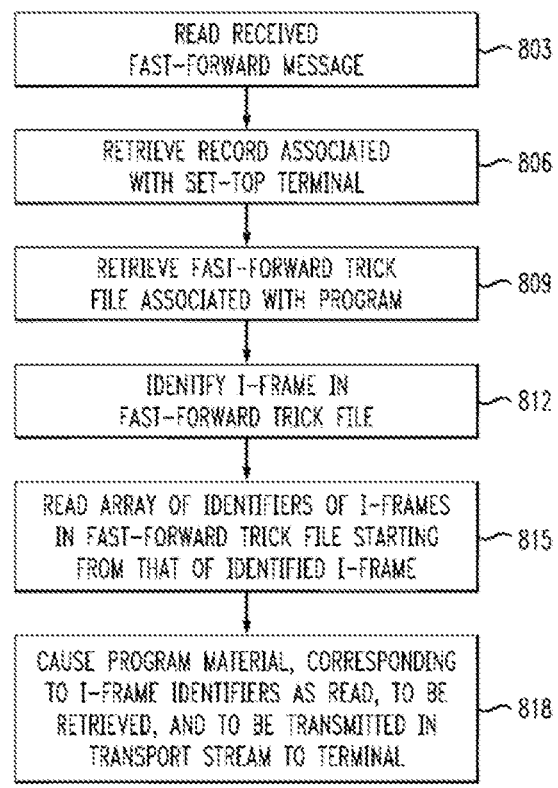
FIG. 8 is a flow chart depicting a process for fast-forwarding a program in response to a fast-forward message from a set-top terminal.

After rewinding a program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a fast-forward initiation command, the last I-frame identifier registered by terminal 158-1, and the IP address (and/or MAC address) identifying terminal 158-1. After receiving such a fast-forward message, processor 119 reads the received fast-forward message, as indicated at step 803 in FIG. 8. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received message, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

In one or more instances, all or some of the programs afforded the NPVR service may not be afforded the fast-forward trick mode function to skip forward the program material in its presentation. Furthermore, in at least some cases, rewind functionality may also be omitted.

It should also be pointed out at this juncture that in the above illustrative embodiment, the transport streams generated by processor 109, which contain, e.g., in-progress (or live) TV broadcast, are recorded in cache manager 111, followed by library manager 113, before they are fed to the requesting set-top terminals. As a result, the transport streams received by the terminals actually are recorded copies of the streams generated by processor 109. However, in another embodiment, the transport streams generated by processor 109 are fed to the requesting set-top terminals in real time, and at the same time switched to cache manager 111 and library manager 113 for recording thereof. Thus, in this other embodiment, when a user at a set-top terminal performs a trick mode function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced back by the real-time transport stream containing the in-progress program.

Figure 9:
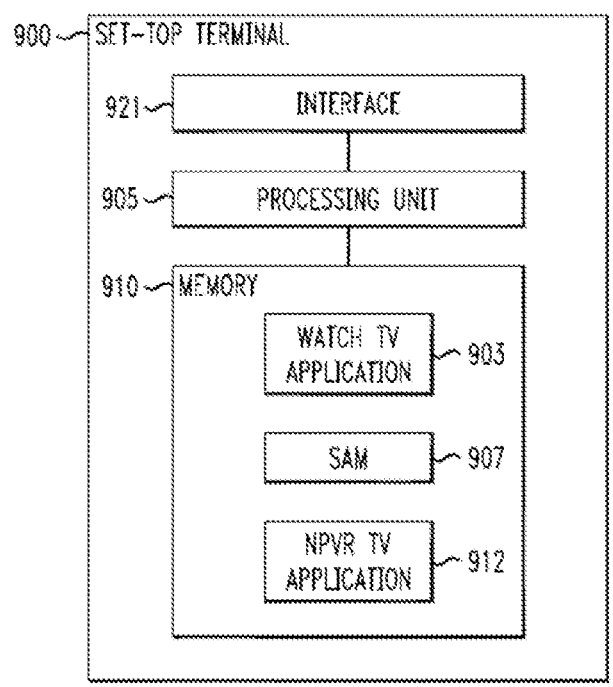
FIG. 9 is a block diagram of a set-top terminal.

As mentioned before, selected program channels (or programs) may be afforded the above-described NPVR service while the rest of the program channels (or programs) may be afforded the traditional broadcast service (although this is entirely optional). A conventional "Watch TV" application (denoted 903 in FIG. 9) is installed in a set-top terminal (denoted 900) to service those program channels (or programs) afforded the traditional broadcast service. It should be noted that set-top terminal 900 here generically represents one of set-top terminals 158-1 through 158-L. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance includes one or more caches, disks, hard drives, NVRAMs, DRAMs, Flash ROMs, and/or ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, AC-3 audio decoding, and video manipulation. ROM may be used for storage of the operating system. Flash ROM may be used for storage of resident application software, as well as patches of the operating system and application software which are downloaded to set-top terminal 900 from head end 105 after set-top terminal 900 has been deployed at the user's premises.

Processing unit 905 orchestrates the operations of set-top terminal 900. It executes instructions stored in memory 910 under the control of the operating system. Service application manager (SAM) 907 forms part of such an operating system of terminal 900. SAM 907 is responsible for monitoring channel change events; administering channel, service and other tables in terminal 900; and maintaining a registry of applications in terminal 900. One such application is aforementioned Watch TV application 903 which is invoked to service a traditional broadcast channel (or program). Another application is "NPVR TV" application 912 which is invoked to service NPVR enabled channels (or programs), and which may be downloaded from head end 105 to memory 910. Application 912 responds to rewind, pause and fast-forward commands initiated by a user, and communicates such commands to head end 105 through interface 921 to perform the trick mode (i.e., rewind, pause and fast-forward) functions on programs in the manner described before, with exception to selected programs which are not afforded the fast-forward trick mode capability (in some cases). In addition, for example, application 912 not only allows a user to reserve future broadcast programs for review, but also reserve, play or restart programming content that has broadcast, in accordance with a "Look Back" feature.

The Look Back feature enables a user to access programming content that has broadcast during a "Look Back Period"—i.e., up to a predetermined period. The actual length of the period is subject to the negotiated rights to the programming content. Specifically, the Look Back feature enables a user to restart an NPVR program that is currently being broadcast. The Look Back feature also enables a user to play an NPVR program that was previously broadcast within the Look Back Period (e.g., the previous two days). In addition, the Look Back feature enables a user to reserve an NPVR program in its entirety that is presently being broadcast or that was previously broadcast within the Look Back Period for subsequent viewing or archiving.

Programs that are available through the Look Back feature may be accessed for viewing or reserving in several ways. For example, a Look Back menu may be accessed when viewing content on an NPVR enabled channel which, in effect, gives that channel an on-demand-like feature. Thus, by accessing a Look Back menu, the viewer may be presented with a categorical listing of all programs that are available for either (1) immediate viewing, or (2) reservation for subsequent viewing. Therefore, the Look Back feature provides a user with the ability to play or reserve previously (or currently) broadcast programs, but does not require the user to denote such programs in advance as a favorite, or to otherwise proactively elect to reserve the program.

Programs that are available through the Look Back feature may be accessed by a listing that may be organized by channel, by reverse chronological order (or chronological order), by theme (movies, sports, drama, etc.), by alphabetical order, etc. The Look Back feature may be made available while a user is viewing a program on an NPVR enabled channel. Further details are provided in the aforementioned US Patent Publication 2005/0034171.

As also noted in the aforementioned US Patent Publication 2005/0034171, in some cases all or some of the programs on an NPVR enabled channel may be subject to the PTOD service. Such PTOD programs may be predetermined programs in a prime time lineup, which a user may not be allowed to time-shift for later viewing otherwise allowed by the above-described NPVR service Look Back feature. However, even in such case, in accordance with some embodiments of the invention, such PTOD programs do have a limited capability for at least a pause function to enable one or more advertising techniques as described below. However, some programs may not be eligible for pause or the "super slice" or "roadblock" enhanced advertisements. In another aspect, the "super slice" or "roadblock" enhanced advertisements may be included as a so-called bumper ad or book-end, if such ad airs within the window. A bumper ad or bookend is an ad that occurs at the beginning or end of a program. By way of clarification and provision of further detail, rights associated with a program may forbid the "super slice" approach. Nevertheless, it may be possible, once such program is available for "start-over" to include the super slice ad in the location where it would have aired had the rights permitted the super slice upon original broadcast.

In addition, in one or more embodiments of the invention, the transport streams are processed and stored in head end 105 based, at least in part, on segmentation messages, as described further below and in a manner further described in the above-mentioned US Patent Application Publication 2004/0015999 of Carlucci et al.

It should be noted that some embodiments of the invention can be used in connection with switched video digital broadcasting. An example of such broadcasting is described in US Patent Application Publication 2003/0056217 of Brooks, entitled "Technique for effectively providing program material in a cable television system," the complete disclosure of which is expressly incorporated herein by reference in its entirety for all purposes.

Aspects of the invention may make use of, for example, segmentation messages (digital cue tones) formatted in accordance with, for example, the ANSI/SCTE 35 standard for Digital Program Insertion Cueing Message for Cable, promulgated by the Society of Cable Telecommunications Engineers and the American National Standards Institute, and formerly known as the DVS-253 (ANSI/SCTE 35 2001) cueing standard. In at least some cases, these segmentation messages may have business rules encoded within. These types of business rules are described in detail in the aforementioned US Patent Application Publication 2004/0244058. Such segmentation messages or digital cue tones may be used to delineate programs, chapters, advertising slots (commercial segments), and so on, as described with regard to FIG. 2. The advertising slots may include national and local slots. Segmentation messages may be in the form of a packet delineated by a sync byte, which is a byte that is unlikely to be replicated in the program stream. Various fields may follow the sync byte, separated by commas. Segmentation messages may be provided, for example, over a single channel for all programs in a multiplex. The ANSI/SCTE 35 standard is hereby incorporated by reference in its entirety for all purposes. The segmentation messages may also have rights encoded therein as set forth in described in detail in the aforementioned US Patent Application Publication 2004/0244058. In some instances, important events (e.g., the below-discussed enhanced "super slice" or "roadblock" advertisements, may be preceded by several digital cue tones to reduce the likelihood that such cue tones may be missed. Due consideration may be had for appropriate Society of Cable Television Engineers (SCTE) and/or Institute of Electrical and Electronics Engineers (IEEE) specifications for MPEG and the like. Current cue tones used for digital program insertion (DPI) are adequate for purposes of one or more embodiments of the invention.

Other segmentation messages that may be provided include a table of all of the segmentation points in a program. A segmentation point is a place in a transport stream in which a content provider can insert a segmentation message. Tables of particular types of segmentation messages or all of the segmentation messages may also be embedded in a program stream. For example, a table of each type of advertising (national and local, for example) in a program may be provided. Additional information may be provided in the segmentation message to identify a commercial sponsor of respective advertising to assist the cable system in inserting appropriate advertising.

By way of review, so-called look back or start-over functionality allows digital cable subscribers to restart specially enabled shows already in progress by using their cable remote controls. Like a full-fledged DVR or NDVR, the service also lets viewers pause and rewind shows in progress. However, start-over functionality typically does not allow for skipping through commercials or storing copies of recorded programs. Such start-over functionality per se is known to the skilled artisan from, for example, the aforementioned US Patent Application Publications US2003/0208767 A1 of Williamson et al. and US Patent Application Publication US2005/0034171 of Benya.

Figure 10:
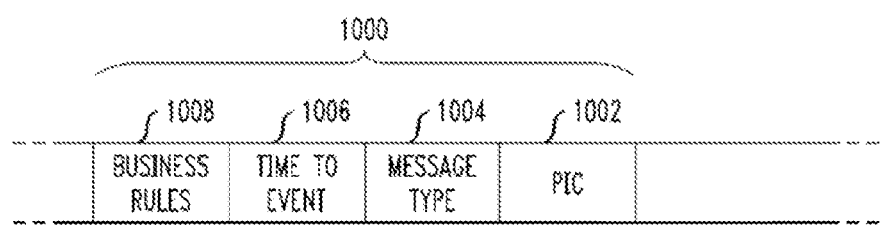
FIG. 10 is an example of a segmentation message in a program stream, according to another aspect of the invention.

FIG. 10 shows a generalized ANSI/SCTE 35 message 1000, which is representative of any of the segmentation messages discussed above. Segmentation message 114 includes PIC field 1002 and time until event field 1006. A message type field 1004 may specify, for example, whether the message is for a "super slice" ad, or something else. A business rules field 1008 may specify pertinent business rules.

Exemplary embodiments are described herein in the context of a cable company or cable multi-system operator (MSO) operating an HFC network and receiving programming from various sources. However, in general terms, one or more of the following types of content network are exemplary of those that can be used with one or more embodiments of the invention:

an HFC or other cable television network (or other content network, for example, a telecommunications company video delivery network such as fiber to the home (FTTH), fiber to the curb (FTTC), a satellite network (using, for example, DVB-S, the original Digital Video Broadcasting forward error coding and modulation standard for satellite television), or digital subscriber line (DSL)), a wireless network such as a cellular network, an 802.11 wireless LAN, H.323 video conferencing over a packet network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA).

It is well known that special events typically viewed by very large audiences command high advertising fees. An example of this is the Super Bowl, where a very large segment of the public will all be watching the same channel at the same time. Aspects of the invention provide techniques to re-create this kind of special advertising event using technology instead of requiring advertisers to await a special event such as the Super Bowl. Advantageously, the above-described start-over technology allows the artificial creation of special advertising opportunities by time-shifting content. In one or more embodiments, the start-over technology captures content on the network and redelivers it at a future time in a time-shifted manner. The special advertisements are referred to interchangeably herein as "super-slice" ads, "roadblock" ads, or "enhanced" ads. In this context, "enhanced" does not necessarily mean that the content of the ad is any different than a conventional ad, but rather that the potential viewing audience is enhanced due to use of one or more techniques herein.

In a preferred but non-limiting embodiment, the MSO owns and/or operates a full service network with time-shifting technology, which network includes set top terminals 158 or similar customer premises equipment (CPE). Terminals 158 may run digital home communication terminal (DHCT) client applications, such as, for example, Time Warner Cable's MYSTRO Digital navigator application; and/or applications conforming to the Open Cable Applications Platform (OCAP) specification (a middleware software layer specification), such as, for example, Time Warner Cable's OCAP Digital Navigator (ODN). The skilled artisan is familiar with the OCAP specification, which is intended to enable the developers of interactive television services and applications to design such products so that they will run successfully on any cable television system in North America, independent of set-top or television receiver hardware or operating system software choices. One or more applications on terminal 158 work in conjunction with head end 150 to implement enhanced advertising techniques described herein. In some embodiments, a suitable triggering mechanism is employed, a non-limiting example of which is a traditional advertising cue tone (or tones), as described herein.

The digital program insertion techniques discussed elsewhere herein, and described in greater detail in, for example, US Patent Application Publication 2004/0015999 of Carlucci et al., US Patent Application Publication 2004/0244058 of Carlucci et al., and US Patent Application Publication 2005/0060745 of Riedl et al., control the timing of events. US Patent Application Publication 2005/0060745 of Riedl et al. is expressly incorporated herein by reference in its entirety for all purposes. A normal stream has cue tones that control where ads can be injected into the stream. If it is desirable for the ad to be longer than the available ad space, the aforementioned start-over technology can be employed. The program content can be shifted to allow the ad to extend over the boundary. In instances where the cue tone is not available, the system could insert the cue tone ahead of time (if not in violation of any rights) so as to create the so-called "super slice" ad segment across the entire platform.

That is to say, if there is an existing ad slot at the location where the "super slice" is desired, and the desired "super slice" does not exceed the length of the existing ad slot, then the aforementioned start-over technology may not be needed. However, if the "super slice" is longer than the length of the available ad slot, or if there is no existing ad slot at the location where the "super slice" is desired, then the use of start-over technology is appropriate. Furthermore, when there is no existing ad slot at the desired location of the "super slice" (i.e., a cue tone is not available), the system inserts the cue tone at the desired location, so long as this does not violate rights associated with the underlying program and/or its traditional advertisers. To further illustrate this latter point, consider a typical program with ad slots (and thus, cue tones) at the "top" of the hour, quarter past the hour, on the half hour, and a quarter before the hour. If it is desired to create the "super slice" on the half hour, no insertion of a cue tone by the system is required, since the standard content already has a cue tone at such point. However, if it is desired to have the "super slice" at, say thirty-seven minutes past the hour, then an appropriate cue tone is inserted by the system.

In one or more embodiments, the result is a "super slice" ad block at the same time on all different channels and services, yet viewers do not miss any portion of the programs they are watching because the aforementioned start-over functionality is triggered. Note that "services" underlay "channels"—i.e., multiple channels may point to the same service and multiple services "may" refer to the same content (Standard Definition (SD), High Definition (HD), Secondary Audio Programs (SAP), and so on).

In one or more embodiments, the "super slice" is employed in connection with linear services (broadcast and time-shifting; i.e., tune-to channels) but may not be employed with video-on-demand (VOD) services as subscribers to such services would not anticipate such advertisements. Furthermore, in the VOD case, where a stream is already in progress, it may be undesirable to tear it down to create another stream. However, for the case of tune-to channels, consider, for example, the case where the MSO offers one hundred channels and at 8 PM wants to inject the "super slice" ad. The system may, e.g., generate a tone or other trigger mechanism at or before 8 PM to trigger the "super slice." One alternative to a tone is to send a message to every client on every terminal 158 to launch an on-demand session at 8 PM. Yet another option is a forced tune to a certain broadcast. Accordingly, by way of example and not limitation, three different ways to deliver the desired "super slice" functionality will now be described.

In a first example, the client running on terminal 158 at the customer's premises receives a message (e.g., cue tone or other) forcing terminal 158 to tune to a designated service. The customer preferably does not "see" the channel change displayed on the terminal. Rather, the terminal is tuned away to another channel; when the "super slice" ad is finished, tuning returns back to the original channel but the original program has been effectively "paused" using start-over techniques as described above, and now resumes from the point it was at prior to the "super slice" ad.

In a second example, applicable in the case of an Internet Protocol Television (IPTV) client, DAVIC, or DOCSIS, to implement the super slice, an instruction is issued to the IPTV terminal to tune to a multicast stream (join a session), which may already be in progress. This second option is essentially the analog of the first option for the case of an IPTV client, DAVIC, or DOCSIS, instead of an RF tuner.

In a third example, an on-demand session is forced. Client code running on terminal 158 initiates stream set-up for the "super slice" ad. In response to a trigger, code on terminal 158 starts a VOD session to create the enhanced advertising opportunity wherein it is highly likely that many people will all be watching the desired adapt the same time.

In one or more embodiments, the desired functionality is achieved by modifying the code on STB 158 so the client can respond to the trigger. With regard to FIG. 9, in one or more embodiments, both applications 903 and 912 are modified so as to first detect the trigger and then initiate the tuning (followed by commencing the so-called start over) to put the client back live. Non-limiting examples of protocols useful for the communication between the head end 105 and terminal 158 include Distributed Systems Management Toolkit Client (DSMTC) or a remote procedure call (RPC) connection where an IP network method is appropriate. Other non-limiting examples of suitable intelligent protocols include Digital Storage Media-Command and Control (DSMCC), remote procedure call (RPC), transfer control protocol/internet protocol (TCP/IP), Internetwork Packet Exchange/Sequenced Packet Exchange (IPX/SPX), asynchronous transfer mode (ATM), and the like.

The following six published US Patent applications pertaining to digital program insertion provide background helpful to the skilled artisan, and the complete disclosures of same are expressly incorporated herein by reference in their entireties for all purposes:

| US Publication Number | Title |
|---|---|
| 20050060745 | System and method for advertisement delivery within a video time shifting architecture |
| 20050060742 | System and method for targeted distribution of advertising without disclosure of personally identifiable information |
| 20050060229 | System and method for advertisement delivery within a video time shifting architecture |
| 20050039205 | Technique for effectively delivering targeted advertisements through a communications network having limited bandwidth |
| 20050015816 | System and method of providing triggered event commands via digital program insertion splicing |
| 20040045022 | Digital message insertion technique for analog video services |

In current digital program insertion techniques, cue tones are already in the program when it enters the head end 105. However, aspects of the invention include having ANSI/SCTE 35 messages or DSM-CC messages inserted in the head end, to signal the "super slice" ad to the STB 158. In one or more embodiments of the invention, the signal received by the head end 105 from a program source is, as noted above, re-encoded by processor 109. To implement one or more embodiments of the invention, processor 109 is provided with an SCTE 104 compatible encoder. In other embodiments, such an encoder is operatively coupled to processor 109 or is present elsewhere in, or accessible to, head end 105. While the skilled artisan will be familiar with SCTE 104 per se, American National Standard ANSI/SCTE 104 2004, Automation System to Compression System Communications Applications Program Interface (API), is nevertheless expressly incorporated herein by reference in its entirety for all purposes.

As will be appreciated by the skilled artisan given the teachings herein, there are many other ways to have ANSI/SCTE 35 messages or DSM-CC messages inserted in the head end. For example, an appropriate software program, running on processor 109 or another processor in head end 105, or distributed over two or more such processors, could monitor the incoming stream, optionally strip the currently embedded cues, and then re-insert new SCTE 35 cues that are all time-synchronized to "go" at the same time to implement the "super slice."

Further details are provided below with regard to FIG. 14.

Thus, in one or more embodiment, the MSO arranges it so that everyone watching a linear program (broadcast or so-called "start-over") all are exposed to the same ad at same time by, for example, one of the three techniques discussed above. In another aspect, the "super-slice" concept can be extended to multiple MSOs. Each MSO could employ appropriate "start-over" technology and client (STB) functionality as described herein. Where the "super slice" is to occur at a standard time where a cue tone is already present, processing for the super slice can be carried out as described. If it is desired to have the "super slice" occur at some different time, each MSO will have to insert a cue tone at the appropriate location. An entity, such as a "lead" MSO could send a message to the participating MSOs to advise of the correct time to insert the cue tone.

Figure 11:
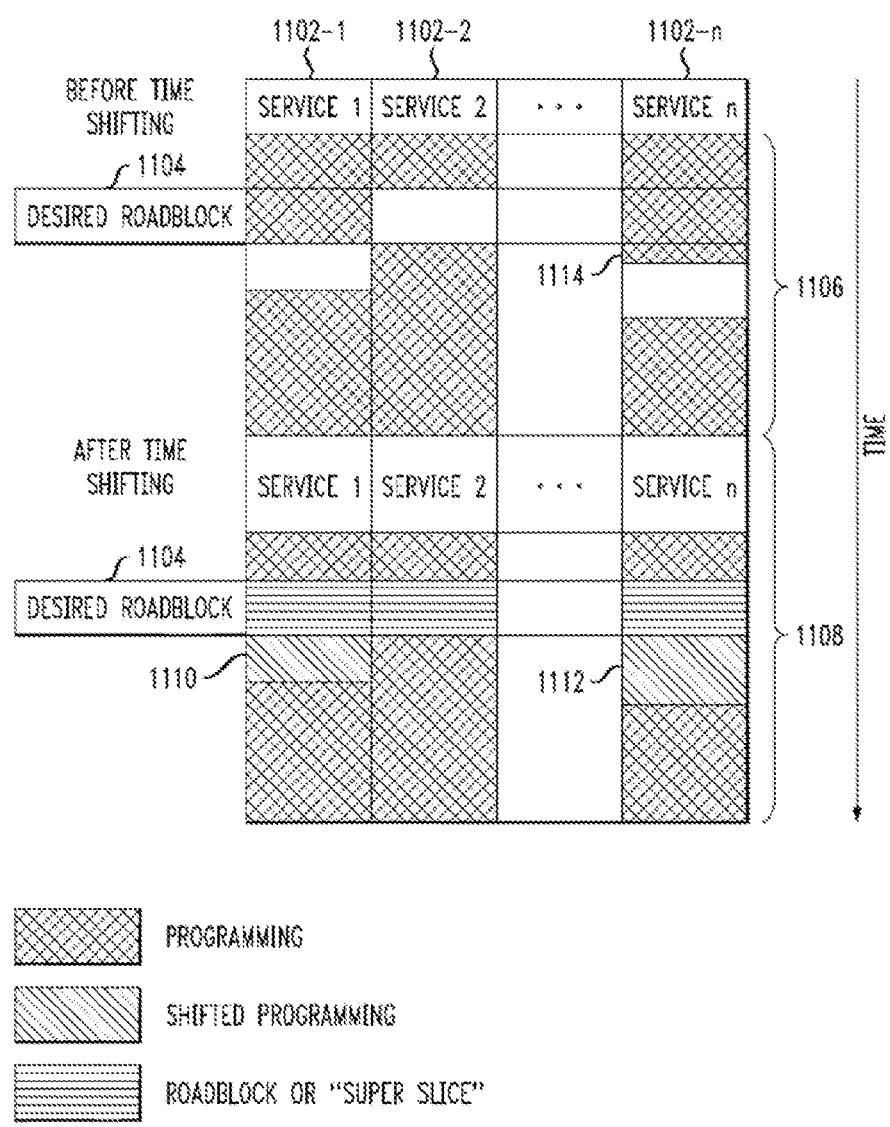
FIG. 11 depicts a plurality of services provided with an enhanced advertisement, according to yet another aspect of the invention.

Reference should now be had to FIG. 11 for a non-limiting exemplary illustration of certain inventive aspects. An MSO provides a plurality of services 1102-1, 1102-2, . . . , 1102-n. It is desired to create a "road block" or "super-slice" enhanced advertising opportunity as shown at 1104. However, prior to time shifting, as shown at 1106, this slot is available only in Service 2, 1102-2. Programming fills the desired slot in Service 1, 1102-1, and in Service n, 1102-n. After time shifting, as shown at 1108, the desired roadblock or super-slice is enforced across all services 1102-1, 1102-2, . . . , 1102-n. The program material that occupied the super slice in Service 1 is shifted to location 1110. The program material that occupied the super slice in Service n is shifted to location 1112, as is the small portion of material 1114 that immediately followed slice 1104 in Service n.

Figure 12:
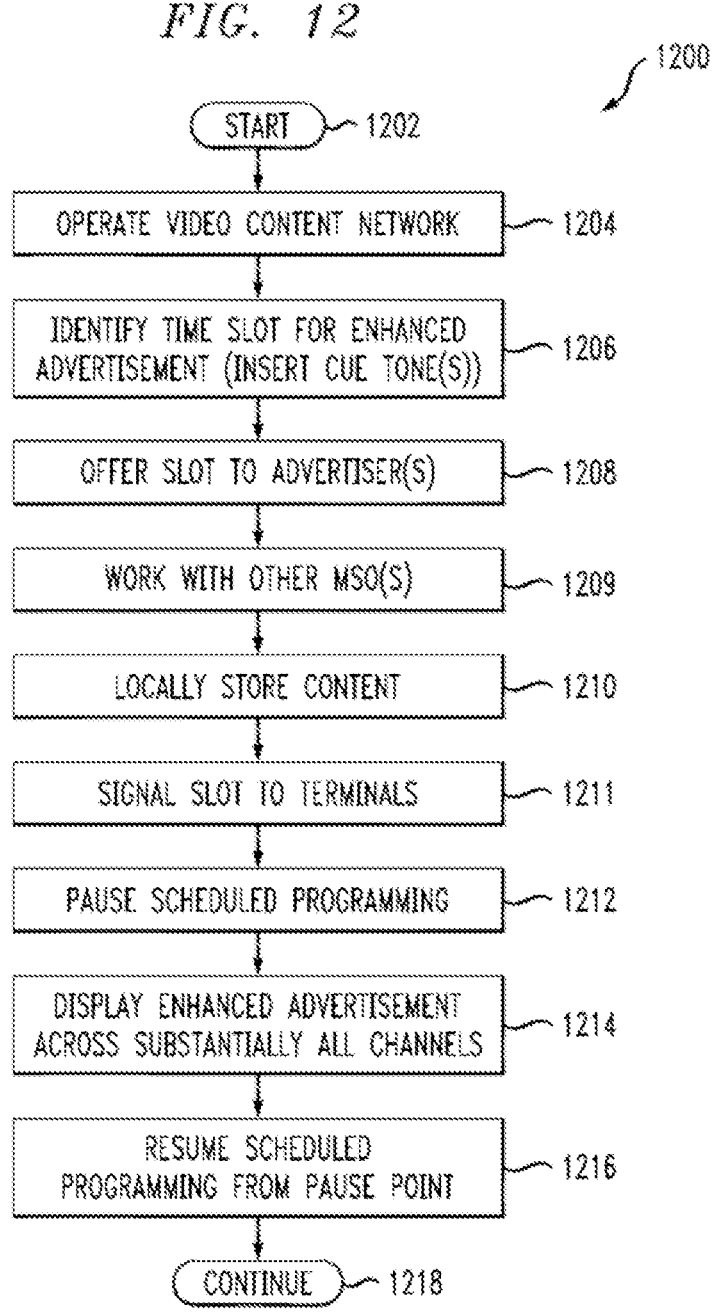
FIG. 12 depicts a flow chart of exemplary method steps, according to still another aspect of the invention.

FIG. 12 shows a flow chart 1200 of exemplary method steps, according to an aspect of the invention. After beginning instep 1202, step 1204 includes operating a video content network 100 having a plurality of program channels. Step 1206 includes identifying a target time slot for an enhanced advertisement (step 1206 also represents one of many possible points at which needed cue tone(s) may be inserted by the MSO). At least some of the plurality of program channels have programs scheduled during the target time slot. Optional step 1208 is discussed below. Step 1211 includes signaling the target time slot to a plurality of terminals 158 connected to the video content network. Each of the terminals is viewing a given one of the program channels prior to the signaling.

Responsive to the signaling, step 1212 includes effectively pausing the programs scheduled during the target time slot at a program time corresponding to a beginning of the time slot, and step 1214 includes causing the enhanced advertisement to be displayed on the terminals across substantially all of the channels. As used herein, "substantially" all of the channels includes all the channels, or a large enough percentage of the channels that the value of the slot for the enhanced advertisement is increased compared to a single-channel slot, with perhaps a few channels not being watched or being premium (or other special) channels not subject to the "super slice." Furthermore, "effectively" pausing programs means that viewers can resume viewing the programs at the program time corresponding to the beginning of the time slot. It should be understood that the program may continue to be transmitted and stored on the head end, or locally at the terminal, so that viewing can resume later, and in this sense, the program is effectively, though not necessarily literally, paused.

Responsive to an end of the enhanced advertisement, step 1216 includes resuming the programs scheduled during the target time slot at the program time corresponding to the beginning of the time slot. Thus, substantially all viewers of the video content network during the target time slot are exposed to the enhanced advertisement regardless of which of the plurality of program channels the viewers were watching during the target time slot. Processing continues at step 1218.

In some instances, the step 1214 of causing the enhanced advertisement to be displayed on the terminals includes causing each of the terminals 158 to tune to a designated channel for viewing of the enhanced advertisement, and the step 1216 of resuming the programs scheduled during the target time slot includes causing each of the terminals to tune back to an original one of the plurality of program channels (in any case, such step of course includes ending the pause state for the paused programs). Preferably, any indication of the tuning to the designated channel is suppressed and not visible on the terminals.

In one or more embodiments, the signaling 1211 includes sending a digital cue tone; such tone may, for example, conform to American National Standards Institute and Society of Cable Telecommunications Engineers standard ANSI/SCTE 35. In some instances, the digital cue tone may have a message type field identifying it as an enhanced advertisement cueing message. In another aspect, the signaling 1211 includes sending a digital storage media command and control (DSM-CC) message. Cue tones and/or DSM-CC messages could have instructions regarding what channel to tune to for the "roadblock," with appropriate enhancements to existing cue tones and/or DSM-CC messages, which will be apparent to those skilled in the art in view of the teachings herein.

In some instances, the step 1216 of resuming the programs scheduled during the target time slot includes tuning to corresponding time-shifted program channels (i.e., if watching channel "A" originally, tune back to a delayed version of channel "A" (say, channel "B"). This is particularly appropriate for those of the programs scheduled during the target time slot that do not have an adequate advertising slot coincident with the enhanced advertisement (e.g., 1102-1 in FIG. 11). In another aspect, resuming step 1216 includes establishing individual video on demand sessions (analogous to ordering a desired movie) for purposes of resuming the program in a time-shifted manner, commencing at the program time corresponding to the beginning of the time slot. Again, this may be particularly useful in cases such as 1102-1 in FIG. 11.

Thus, if the user is watching a stream, there is, in one or more embodiments, a need to request it again from a certain point in time (beginning of the super slice), typically based on the nearest I-frame. In some cases, in order to resume, a session is set up, and effectively, the system tells everyone who was watching to resume (e.g., retune) from the appropriate point. Similar considerations apply in the case of an IPTV session.

By way of example, suppose that, initially, one or more people are watching channel A. The network X feed for channel A may be continuous, for example, even during the "super slice." However, assuming that the "super slice" lasts, for example, 5 minutes, the system may set up channel B with content identical to that from channel A but time-shifted 5 minutes. In such case, people who were watching the "super slice" ad are directed to channel B, even though channel A is what is coming into the head end from network X. Channel B is what the head end sends out via, for example, switched digital techniques, IPTV, broadcast, a VOD session, and so on. In another aspect, the shifted material may be re-inserted on the system as a dynamically re-assigned channel A in which case "everything" remains shifted; that is, anyone tuning to network X is directed to the shifted material. To eventually get back to a real-time version of network X material, one or more ad slots may be dropped (particularly since the enhanced revenue form the 'super slice" may more than make up for any loss form dropping subsequent slots). Once the gap is eliminated, channel B may be dispensed with.

In at least some instances, content for the road-blocked channels can be re-sent by dynamically adding the channels back, in a manner similar to switched digital techniques. In some cases, broadcasting ceases and the roadblock is created by putting the desired enhanced ad on all channels at the same time, using dynamically added and removed channels as in switched digital techniques.

In one or more embodiments, the terminal tunes away from the original program to view the roadblock ad, and when the ad is complete, the terminal re-tunes (time shifted as necessary, as discussed with regard to FIG. 11). If shifting is needed, the terminal may start an on-demand session or tune to a network stream with buffered content. As an extreme example, consider a ½ hour ad in the middle of an hour-long program. The viewer watches ½ hour of the program and still has 30 minutes of program left. Upon resumption, the viewer is sent to a session—for example, on the local drive, via IPTV, or broadcast. The channel that is accessed upon resumption may, for example, remain time-shifted until the user tunes away, after which "live" service may resume. In a more typical case, the shifting may only be on the order of about 5-10 minutes (or less), which can be gradually reclaimed through the day.

In switched digital techniques, a channel may be available but is not "out on the system," so to speak; however, when a subscriber tunes to it, the system allocates a QAM to carry the program and starts to broadcast that channel. Such techniques can be adapted to implement aspects of the invention. For example, the shifted session could be placed onto the same kind of carrier and the viewer could watch the entire channel in a time shifted manner (possibly without even being aware of it). In another aspect, an on-demand or startover session is employed, and does not end until the user moves to another channel—when there are no more viewers, such a session would "tear itself down."

In one or more embodiments, the step 1214 of causing the enhanced advertisement to be displayed on the terminals includes causing each of the terminals 158 to initiate a video-on-demand session for viewing of the enhanced advertisement and the step 1216 of resuming the programs scheduled during the target time slot includes causing each of the terminals 158 to end the video-on-demand session.

In one or more instances, the step 1214 of causing the enhanced advertisement to be displayed on the terminals includes causing each of the terminals 158 to tune to a multicast stream for viewing of the enhanced advertisement, and the step of resuming the programs scheduled during the target time slot includes tuning to corresponding time-shifted IPTV streams (at least in cases such as 1102-1 in FIG. 11, where there is no ad slot at the desired roadblock location). This is similar to the channel A and B example above, except implemented in IPTV.

Optional step 1208 includes offering the time slot to an advertiser. If desired, steps 1206, 1208, and/or 1209 (discussed below) could be performed cooperatively; that is, an MSO could work with an advertiser (and possibly other MSOs) to identify one or more suitable "super slice" time slots.

In still another aspect, an optional additional step 1210 includes storing, on the terminals 158 (or on DVRs or the like associated therewith), local copies of the programs on the plurality of program channels. In such a case, the pausing step 1212 includes bookmarking corresponding ones of the local copies at the program time corresponding to the beginning of the time slot, and the resuming step 1216 includes each of the terminals accessing a corresponding one of the local copies based on the bookmarking.

In yet a further aspect, where a cross-MSO super slice is desired, optional step 1209 includes communicating with one or more additional video content networks to enable the enhanced advertisement to be displayed during the target time slot on the at least one additional video content network. As noted above, where the desired super slice does not coincide with an ad slot inserted by the network, appropriate coordination among MSOs can be provided so that each inserts a digital cue tone for the desired super slice time.

Figure 14:
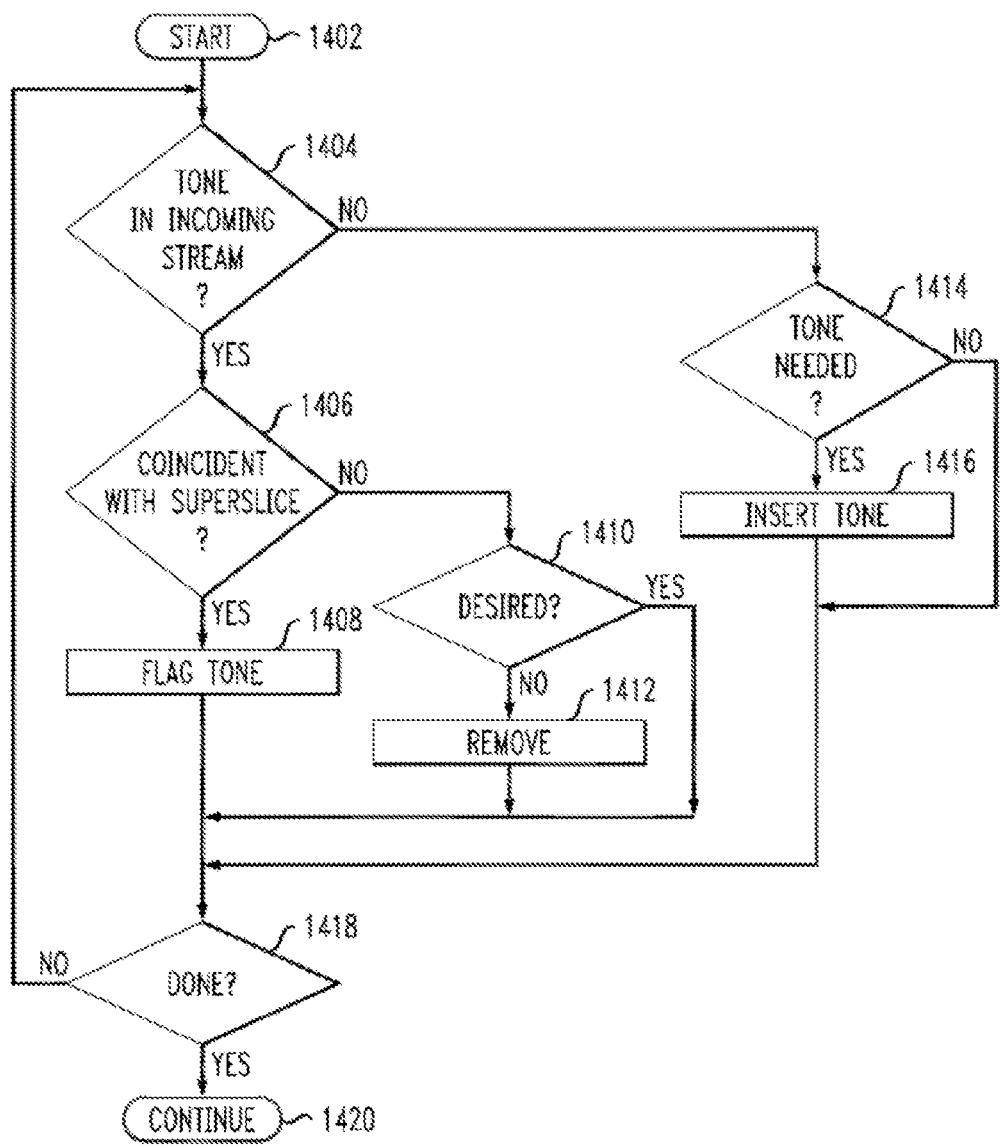
FIG. 14 shows a flow chart of exemplary method steps, according to a further aspect of the invention.

FIG. 14 shows a flow chart of exemplary method steps for addressing the cue tones for signaling the super slice, according to an aspect of the invention. As noted above, in one or more embodiments of the invention, ANSI/SCTE 35 messages or DSM-CC messages are inserted using appropriate capability in head end 105; by way of example and not limitation, when material from a program source is re-encoded by processor 109. As seen in FIG. 14, after beginning in step 1402, the incoming stream is monitored to determine whether a tone is present at a given point, as per decision block 1404. If such is the case, in decision block 1406, a determination is made whether the existing tone is coincident with a desired "super slice." If this is so, the existing tone can be appropriately modified (for example, by adding a flag that it heralds a "super slice"), as per step 1408. If the existing tone is not coincident with a desired "super slice," a determination is made in block 1410 whether it is still desired (for example, to signal a conventional ad). If not desired, it may be removed in step 1412.

If there is no tone at a given point in the incoming stream, a determination is made at block 1414 whether a tone is needed at such point (for example, when the super slice is desired at a non-standard time). If a tone is needed at a given point where one does not already exist, it is added per step 1416. Following step 1408, step 1412, the YES branch of block 1410, step 1416, and the NO branch of block 1414, a determination is made in block 1418 whether the incoming stream continues, in which case processing is not done, and control flows back to prior to block 1404. If the incoming stream no longer requires monitoring, processing is done for the time being, and flow proceeds to CONTINUE block 1420.

System and Article of Manufacture Details

Figure 13:
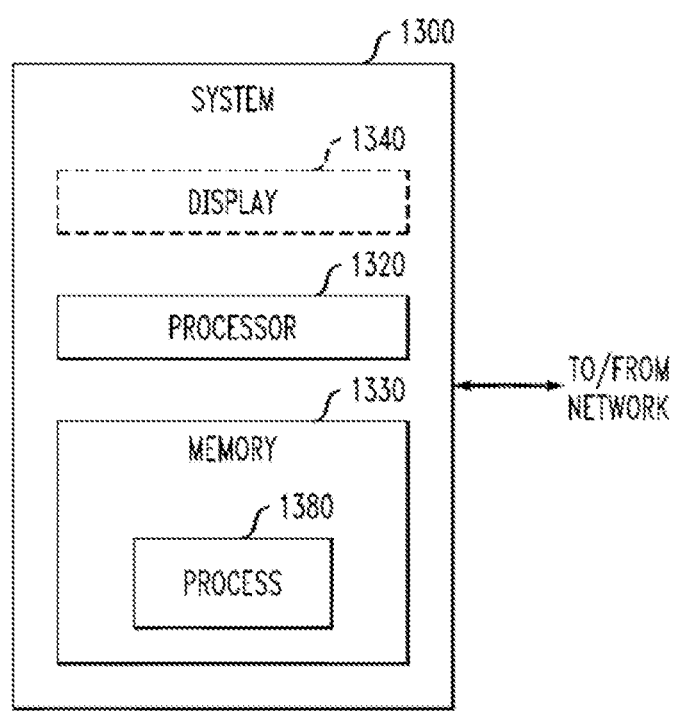
FIG. 13 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable storage medium that contains one or more programs that when executed implement such step or steps. FIG. 13 is a block diagram of a system 1300 that can implement part or all of one or more aspects or processes of the present invention, processor 1320 of which is representative of processors such as those in elements or blocks depicted in the other figures. In one or more embodiments, inventive steps are carried out by one or more of the processors in conjunction with one or more interconnecting network(s). As shown in FIG. 13, memory 1330 configures the processor 1320 to implement one or more aspects of the methods, steps, and functions disclosed herein (collectively, shown as process 1380 in FIG. 13). The memory 1330 could be distributed or local and the processor 1320 could be distributed or singular. The memory 1330 could be implemented as an electrical, magnetic or optical memory, or any combination of these or other types of storage devices. It should be noted that if distributed processors are employed, each distributed processor that makes up processor 1320 generally contains its own addressable memory space. It should also be noted that some or all of computer system 1300 can be incorporated into an application-specific or general-use integrated circuit. For example, one or more method steps could be implemented in hardware in an ASIC rather than using firmware. Display 1340 is representative of a variety of possible input/output devices (e.g., displays, keyboards, mice, and so on).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable storage medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable storage medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
operating a video content network having a plurality of program channels;
identifying a target time slot for an enhanced advertisement, at least a first group of said plurality of program channels having a first group of programs scheduled during said target time slot;
signaling said target time slot to a plurality of terminals connected to said video content network, each of said terminals viewing a given one of said program channels prior to said signaling;
maintaining recordings of said first group of programs in a node of said video content network remote from said terminals;
responsive to said signaling:
  effectively pausing said first group of programs at a program time corresponding to a beginning of said time slot; and
  causing said enhanced advertisement to be displayed on said terminals by sending said enhanced advertisement in real time from said node of said video content network remote from said terminals as a multicast stream to which said terminals tune; and
responsive to an end of said enhanced advertisement, resuming said first group of programs at said program time corresponding to said beginning of said time slot by making said recordings available from said node of said video content network remote from said terminals as corresponding time-shifted internet protocol television streams to which said terminals tune;
whereby substantially all viewers of said video content network during said target time slot are exposed to said enhanced advertisement regardless of which of said plurality of program channels said viewers were watching during said target time slot.

2. A method comprising the steps of:
operating a video content network having a plurality of program channels;
identifying a target time slot for an enhanced advertisement, at least a first group of said plurality of program channels having a first group of programs scheduled during said target time slot;

signaling said target time slot to a plurality of terminals connected to said video content network, each of said terminals viewing a given one of said program channels prior to said signaling;

storing, on said terminals, local copies of said first group of programs;

responsive to said signaling:
- effectively pausing said first group of programs at a program time corresponding to a beginning of said time slot by bookmarking corresponding ones of said local copies at said program time corresponding to said beginning of said time slot; and
- causing said enhanced advertisement to be displayed on said terminals by sending said enhanced advertisement in real time from a node of said video content network remote from said terminals; and responsive to an end of said enhanced advertisement, resuming said first group of programs at said program time corresponding to said beginning of said time slot by each of said terminals accessing a corresponding one of said local copies based on said bookmarking;

whereby substantially all viewers of said video content network during said target time slot are exposed to said enhanced advertisement regardless of which of said plurality of program channels said viewers were watching during said target time slot.

3. A video content network for placing an enhanced advertisement in a target time slot, said video content network having a plurality of program channels, said video content network comprising:

means for signaling said target time slot to a plurality of terminals connected to said video content network, each of said terminals viewing a given one of said program channels prior to said signaling, at least a first group of said plurality of program channels having a first group of programs scheduled during said target time slot;

means for maintaining recordings of said first group of programs in a node of said video content network remote from said terminals;

means for, responsive to said signaling:
- effectively pausing said first group of programs at a program time corresponding to a beginning of said time slot; and
- causing said enhanced advertisement to be displayed on said terminals by sending said enhanced advertisement in real time from said node of said video content network remote from said terminals as a multicast stream to which said terminals tune; and means for, responsive to an end of said enhanced advertisement, resuming said first group of programs at said program time corresponding to said beginning of said time slot by making said recordings available from said node of said video content network remote from said terminals as corresponding time-shifted internet protocol television streams to which said terminals tune;

whereby substantially all viewers of said video content network during said target time slot are exposed to said enhanced advertisement regardless of which of said plurality of program channels said viewers were watching during said target time slot.

4. An apparatus for placing an enhanced advertisement in a target time slot in a video content network having a plurality of program channels and a plurality of terminals, said apparatus comprising:

a memory; and at least one processor located in a node of said video content network remote from said terminals and connected thereto, said at least one processor being coupled to said memory and being operative to:
- signal said target time slot to said plurality of terminals, each of said terminals viewing a given one of said program channels prior to said signaling, at least a first group of said plurality of program channels having a first group of programs scheduled during said target time slot;
- maintain recordings of said first group of programs in said node of said video content network remote from said terminals
- responsive to said signaling:
  - effectively pause said first group of programs at a program time corresponding to a beginning of said time slot; and
  - cause said enhanced advertisement to be displayed on said terminals by sending said enhanced advertisement in real time from said node of said video content network remote from said terminals as a multicast stream to which said terminals tune; and
- responsive to an end of said enhanced advertisement, resume said first group of programs at said program time corresponding to said beginning of said time slot by making said recordings available from said node of said video content network remote from said terminals as corresponding time-shifted internet protocol television streams to which said terminals tune;

whereby substantially all viewers of said video content network during said target time slot are exposed to said enhanced advertisement regardless of which of said plurality of program channels said viewers were watching during said target time slot.

\* \* \* \* \*